3,467,544
PROCESS FOR PREPARATION OF AUTOGENOUS-
LY REACTANT MINUTE CAPSULES
Nicola Marinelli, Kettering, and John G. Whitaker, Union,
Ohio, assignors to The National Cash Register Company, Dayton, Ohio, a corporation of Maryland
No Drawing. Filed Apr. 4, 1966, Ser. No. 539,718
Int. Cl. B01j 13/00; C08h 7/00
U.S. Cl. 117—100                                4 Claims

ABSTRACT OF THE DISCLOSURE

A process is provided for preparation of autogenously reactant capsules wherein the capsules contain a polymerizable material and have a solid particulate curing agent for the polymerizable material partially embedded on the outer surface of the capsules. Capsules of this invention are intended to be used, in a mass, as an autogenously reactive composition which is activated by rupture of the capsule walls to allow reactive contact between the curing agent and the polymerizable material to form a cured polymeric material.

---

This invention relates to a process for the preparation en masse of minute capsules containing internally a liquid and having anchored in the exterior of the capsule walls a profusion of solid, finely-divided particles of reactant material. This invention in one specific form pertains to an improved process for the preparation, en masse, of autogenously reactive, minute, seamless walled capsules containing a curable liquid resin and having, as the particulate exterior coating anchored in the capsule wall, a solid, finely-divided curing agent.

The novel process, as hereinafter disclosed, is useful and represents an advance in the art in the preparation of said capsules and an improved capsule product. Whereas former processes for the preparation of pseudo-dry, individual capsules having an exterior adherent covering of solid particles co-reactant, or not, with the capsule contents rely upon entrainment with an adhesive or rely on triboelectric or other similar forces, the nature of which is not entirely understood, to maintain clinging contact between solid particles and the capsule walls, the novel process allows engagement of wet, swollen capsule walls by the co-reactant particles and the subsequent anchorage of the particles to the capsule walls by being partially embedded and clasped in the outer wall structure as the swollen walls shrink while drying. Such a product, especially as concerns autogenously reactive capsules having the exterior solid particles embedded rather than clinging to the capsule walls, but not buried completely therein, is more capable of withstanding the rigors of handling and use without undue diminution of exposed surface or shedding of the particles from the wall.

In an earlier application for United States patent filed by John G. Whitaker (one of the applicants herein) on Feb. 28, 1966, Ser. No. 530,392, now Patent No. 3,215,381 and titled "Autogenously Reactant, Minute Capsules for Sealant Systems," the inventor teaches the preparation of curable-liquid-retaining capsules having a containing polymeric wall, said wall having solid co-reactant particles clinging thereon by surface attraction. These capsules, when crushed, allow reactive contact between the finely-divided co-reactant particles—tellurium dioxide, manganese dioxide, lead dioxide, or antimony trioxide—and the contained curable liquid polymeric material—a polysulfide resin having the general structure

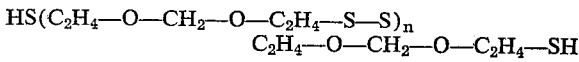
$$HS(C_2H_4-O-CH_2-O-C_2H_4-S-S)_n$$
$$C_2H_4-O-CH_2-O-C_2H_4-SH$$

where $n$ is an integer and can be varied from 1 to 25. The process disclosed in the above-mentioned Whitaker United States patent application requires that the curable-liquid-containing capsules be first completed to a rigid-walled, pseudo-dry form and subsequently treated with the curing agent powder to form but a clinging cover of co-reactant particles.

Although the preferred embodiment of the invention relates to autogenous capsules where a reaction occurs between the anchored particles and the released liquid, such particles are also useful as mechanical parting materials to keep otherwise sticky capsules from clumping, and they may be selected to react with environmental co-reactants, as selected for a given purpose.

As will be seen in the preferred and other embodiments of this invention, definite new techniques have been provided to prepare the novel product. The preferred example of this invention includes the preparation of liquid-containing capsules, according to the teachings of Barrett K. Green and Lowell Schleicher (United States Patent No. 2,800,457, issued July 23, 1957), having rigid, hydrophilic polymeric walls as brought about by treatment of said capsules, while in the wet state, with hardening (cross-linking) agents.

Example 1

To make the hydrophilic polymeric material walled capsules, 20 grams of high-quality, acid-extracted pigskin gelatin (285–305 grams Bloom strength, isoelectric point 8–9) and 20 grams of gum arabic were dissolved in 1,120 grams of distilled water maintained at a temperature of 50 degrees centigrade and agitated in a vessel of appropriate size. The pH was adjusted to 4.5. The system temperature was lowered to 40 degrees centigrade, and 160 grams of liquid polysulfide resin (chosen in this example as one of two prospective co-reactants) having a molecular weight of about 1000 and a viscosity at 25 degrees centigrade of 700 to 1200 centipoises (sold as "LP-3" by Thiokol Chemical Corporation, Bristol, Pa., United States of America) was poured slowly into the warm, stirring aqueous system. Agitation was adjusted to give the desired size of particles, which were globular, and the entire system was allowed to cool while constant agitation was maintained. When the agitated system had cooled to about 25 degrees centigrade, it was chilled in an ice bath to less than 10 degrees centigrade, and to it was added 10 milliliters of 25%, by weight, aqueous glutaraldehyde. The system was allowed to stir for about sixteen hours, with the temperature gradually increasing to about 25 degrees centigrade. If clumping is to be totally avoided at the drying stage, add 5 milliliters of a cationic surfactant, such as "Adogen 446" as sold by Archer-Daniels-Midland Company, Minneapolis, Minn., United States of America, with continued stirring, followed after thirty minutes with the addition of 20 to 40 milliliters of a 5%, my weight, aqueous solution of an anionic surfactant ("Armac HT" as sold by Armour Industrial Chemical Company, Chicago, Ill., United States of America) with stirring for an additional one hour. Agitation was then stopped, and the coated resin-containing globules were allowed to settle. The supernatant liquid was poured off, and an amount of distilled water equal to the discarded liquid was added to the vessel, with agitation resumed. To this stirring mixture of capsules and distilled water was added 100 grams of the particles which constitute the coating on the outside walls of the capsules—manganese dioxide (which is a curing agent for the polysulfide resin)—having an average particle size of about, in this case, 20 microns ("Manganese Hydrate No. 37" having 17% to 23%, by weight, water of hydration, as sold by General Metallic Oxides Company, Jersey City, N.J., United States of America). When the mixing was complete, the solids comprising the capsules and the curing agent were then filtered on a vacuum filtration apparatus. At this time, the filter cake consisted of particle-coated capsules with an excess of undeposited and unattached particles. The filter cake was removed from the filter funnel and crumbled into a two-unit wire mesh sieve system which would retain capsules of more than 105 microns in diameter but let the smaller capsules and free particles pass. The sieve-system, as used, was placed on a forced-air drier, and air at a temperature of approximately 25 degrees centigrade was circulated through the sieves with enough force to blow the small capsules and particles of excess dry curing agent out through the top sieve. The blower was operated until the sieve contents were dry and free-flowing. The product was capsules, graded according to size and containing the curable liquid resin, having anchored on the outside surface the particles of curing agent.

The above preferred embodiment of this invention discloses the novel method of simultaneously separating and isolating capsules which contain curable liquid resin and anchoring in the walls of said capsules a profusion of solid finely-divided curing agent material particles to render the capsules autogenously reactive. It is to be understood as obvious that capsules containing other kinds of liquids can be treated in this manner and that other kinds of solid particles can be used in this process.

The second example of this invention illustrates the use of applied materials which are neither co-reactive with the capsule contents nor acting to cure the contents.

Example 2

The encapsulation procedure of Example 1 was followed, with the substitution of 160 grams of toluene for the polysulfide resin and the substitution of 60 grams of a finely-divided inert mineral filler material, such as mangesium silicate ("Celkate T-21" as sold by Johns-Manville Company, New York, N.Y., United States of America, with an ultimate particle size of 0.1 micron), for the 100 grams of manganese dioxide.

The aforestated Examples 1 and 2 serve to disclose the invention in its broad nature. Any capsules having water-swellable walls can be treated by the process of this invention for the purpose of anchoring onto each of them the profusion of solid particles.

The anchored particles, apart from serving the purpose which their properties provide, serve to keep one capsule from actual wall-to-wall contact with an adjacent capsule, thereby eliminating adhesive clustering.

We claim:

1. A process for making, en masse, minute autogenously reactant capsules which have seamless walls comprising gelation and retaining curable liquid polymeric material and which have partially embedded in the exterior surface portion of the capsule wall, a multitude of particles of a solid curing agent for the curable liquid polymeric material,
    (a) adding a cross-linking agent to a slurry system of swollen, hydrophilic polymeric-walled, capsules containing curable liquid polymeric material dispersed in an aqueous vehicle in order to harden the capsule walls;
    (b) exchanging aqueous vehicle from the slurry system with water to yield a new aqueous system of capsules;
    (c) mixing into the new aqueous system of capsules, an amount of finely-divided solid curing agent particles, which particles are insoluble in the water of the system and are smaller in size than the capsules;
    (d) eliminating water from the system to assure contact of swollen capsule walls with the particles; and
    (e) further drying the capsule-solid-particle mass by evaporation of residual water to yield individual capsule entities each having partially embedded in its surface a multitude of the finely-divided solid curing agent particles, whereby each capsule, when ruptured, releases its retained contents to react with the nearest of the curing agent particles.

2. The process claim 1 wherein the capsules contain curable polysulfide polymeric material and the finely-divided solid curing agent is at least one of the curing agents taken from the group consisting of manganese dioxide, tellurium dioxide, antimony trioxide, and lead dioxide.

3. A process for producing, en masse, minute liquid-containing capsules with seamless walls comprising gelatin and having, partially embedded in the capsule walls, a multitude of finely-divided, solid curing agent particles, the process steps including,
    (a) adding a cross-linking agent to a slurry system of swollen, hydrophilic polymeric-walled, liquid-containing capsules dispersed in an aqueous vehicle in order to harden the capsule walls;
    (b) exchanging aqueous vehicle from the slurry system with water to yield a new aqueous system of capsules;
    (c) mixing into the new aqueous system of capsules, an amount of finely-divided solid curing agent particles, which particles are insoluble in the water of the system and are smaller in size than the capsules;
    (d) compacting the capsule-solid-particle mixture by filtration of water from the system; and
    (e) further drying the capsule-solid-particle mass by evaporation of residual water to yield individual capsule entities each having partially embedded in its exterior a multitude of the finely-divided, solid curing agent particles.

4. A process for partially embedding small particles of solid material in the walls of minute capsules, the wall material of which capsules comprises chemically cross-linked gelatin and is swellable but not soluble in aqueous liquids, including the steps of:
    (a) establishing a slurry of an aqueous liquid and said capsules and particles, which particles are insoluble in the water of the system and are smaller in size than the capsules;
    (b) draining free aqueous liquid from the slurry after the capsule walls are swollen, leaving a solid, moist, cake consisting of swollen-walled capsules each having adherent thereto a multitude of particles; and
    (c) drying the cake of swollen-walled capsules with agitation to shrink the capsule walls and partially embed the adherent particles, and to form individual capsules kept apart from physical contact of the wall material of one capsule with the wall material of an adjacent capsule.

References Cited

UNITED STATES PATENTS

| 2,429,698 | 10/1947 | Schneider | 117—161 X |
| 2,584,264 | 2/1952 | Foulks | 117—161 X |
| 2,800,457 | 7/1957 | Green et al. | 252—316 |
| 3,018,258 | 1/1962 | Meter et al. | 260—6 |
| 3,179,600 | 4/1965 | Brockett | 252—316 |
| 3,225,017 | 12/1965 | Seegman et al. | 117—161 X |
| 3,275,579 | 9/1966 | Stierli et al. | 117—100 X |

OTHER REFERENCES

"Astronauts Stick with Micro Capsules," Product Engineering, January 16, 1967, p. 31.

WILLIAM D. MARTIN, Primary Examiner

MATHEW R. P. PERRONE, Assistant Examiner

U.S. Cl. X.R.

252—316; 260—6